United States Patent [19]
Boldt

[11] 4,296,134
[45] Oct. 20, 1981

[54] LIQUID EGG BLEND

[76] Inventor: Wayne A. Boldt, S. 66 W20230 Tans Dr., Muskego, Wis. 53150

[21] Appl. No.: 786,301

[22] Filed: Mar. 8, 1977

Related U.S. Application Data

[63] Continuation of Ser. No. 569,607, Apr. 21, 1975, abandoned, which is a continuation-in-part of Ser. No. 469,476, May 13, 1974, abandoned.

[51] Int. Cl.³ .................................................. A23L 1/32
[52] U.S. Cl. ..................................... 426/250; 426/614
[58] Field of Search ........................ 426/250, 580, 614

[56] References Cited
U.S. PATENT DOCUMENTS 3,594,183  7/1971  Melnick et al. ................. 426/614 X
3,911,144  9/1972  Strong et al. .................... 426/614 X

*Primary Examiner*—Robert A. Yoncoskie
*Attorney, Agent, or Firm*—Berman, Aisenberg & Platt

[57] ABSTRACT

An edible liquid egg blend product which is at least 99 percent cholesterol free, which has no more than 1.25 percent by weight of fat and a maximum of 0.80 calorie per gram, comprises (by weight) from 60 to 96 parts of liquid natural egg whites, from zero to 18 parts of water, from 2.0 to 10.5 parts of protein replacement, e.g. nonfat dried milk solids, powdered egg albumen and soy protein, from 0.2 to 0.95 part of stabilizer, from 0.1 to 2.5 parts of flavoring and from 0.01 to 0.20 part of coloring.

30 Claims, No Drawings

LIQUID EGG BLEND

RELATED APPLICATION

This application is a continuation of application Ser. No. 569,607, filed Apr. 21, 1975, now abandoned, which is a continuation-in-part of copending application Ser. No. 469,476, filed on May 13, 1974, now abandoned, and entitled: LIQUID EGG BLEND.

BACKGROUND OF THE INVENTION

1. Field of the Invention

A liquid egg blend, adapted to be kept under refrigeration, is useful for preparing egg dishes, such as scrambled eggs, omelets and souffles. It is particularly suited for those restricted cholesterol intake diet, such as certain heart patients, and for those whose diets are limited with respect to fat and/or calories.

2. Prior Art

Gorman (U.S. Pat. No. 3,207,609) provides a low fat, low calorie and low cholesterol dry egg white product in powder form and which comprises from about 30 to 50 percent by weight of dried egg albumen (dry egg white), about 15 to 30 percent by weight of water-binding carbohydrates, from about 15 to 30 percent by weight of agglomerated milk solids and from about 3 to 30 percent by weight of edible oil. The resulting product, after hydration and frying, is described by Melnick (U.S. Pat. No. 3,563,765) as "so different from scrambled eggs in odor, texture and taste as to be unacceptable to most users". Melnick's disclosure is directed to dried egg yolk solids from which at least about 50 percent (but not more than 90 percent) of the original fat and at least about 50 percent of the original cholesterol have been extracted.

According to Jones (U.S. Pat. No. 3,475,180) "considerable emphasis has been placed upon low-calorie and low-fat diets. Since essentially all fat, and a large proportion of the calorific content, of whole eggs is contributed by the egg yolk, restricted use of egg yolks is indicated for those persons adopting low-calorie and/or low-fat diets. When attempts were made to produce palatable products using egg whites alone, the results have been notably unsatisfactory". Jones thus devised a low-calorie high-protein dried egg product having a reduced fat content and comprising (by weight) an intimate admixture (pH adjusted to at least 9) of approximately 150 parts of liquid egg white, 30 to 100 parts of liquid whole egg, 8 to 16 parts of non-fat milk solids and/or sweet whey solids, 0.5 to 4 parts of isolated vegetable protein solids and 0.1 to 2 parts of hydrophilic thixotropic material (sodium carboxymethylcellulose, pregelled starch, methyl cellulose, guar gum, gum arabic, gum tragacanth, agar-agar, carrageen, alginic acid and/or alginic acid salts). He makes it clear that the egg yolk is required for a fully satisfactory product.

Greenlee (U.S. Pat. No. 1,438,232) is directed to an emulsified egg-white product to replace egg yolks in baking. To make such a product, he adds fat to his egg whites. He may also add protein solids. A typical composition according to his invention contains 62 percent egg white, 24 percent cotton seed oil, 10 percent sugar, 3.9 percent milk powder and 0.1 percent vanilla and color. Cotton seed oil is used as the principal replacement for the yolk; calories and fats are not eliminated. Sugar is employed as a preservative and to emulsify the composition, thus adding undesirable calories and carbohydrates. This presence of sugar renders the product unsuitable for the preparation of scrambled eggs and some types of omelets. The Greenlee product is for the use of bakers (rather than for use as a substitute for fresh eggs in preparing egg dishes) and is not suitable, because of the presence of fats and carbohydrates, for patients on a restricted carbohydrate intake diet, such as persons on a restricted calorie diet.

Furber directed his attention to the artificial production of the white of an egg (U.S. Pat. No. 458,419), to a substitute for egg yolks (U.S. Pat. No. 458,420) and to a substitute for whole eggs (U.S. Pat. No. 471,236), but none of these approximates the compositions contemplated by the present invention.

SUMMARY OF THE INVENTION

An edible and highly palatable egg product is prepared from liquid egg whites after the yolk is removed therefrom. The product is a blend which is essentially free from fats, oils, cholesterol, yolk, sugars and calories; it has an acceptable viscosity (texture), flavor (taste), odor and color (appearance). The blend has a protein content of from about 7.5 to about 19 percent by weight, but the protein content is preferably from 11 to 15 percent by weight and, more specifically, about 12 percent by weight, whereas that of fresh egg whites is about 10.9 percent by weight. Although the blend is primarily one based on whites from chicken eggs, edible shell eggs of other fowl are alternatively employed.

The blend is that of fresh liquid egg whites, water, protein, coloring, stabilizer and flavoring. The blend can be fortified with vitamins and/or minerals, but such are not essential to the invention. Further additives, such as monosodium glutamate, can be incorporated into the blend, as desired, but sodium-containing additives are counterindicated for those whose diets are restricted with regard to sodium intake.

Subject matter herein disclosed further includes a cholesterol-free low calorie egg product comprising by weight a. liquid egg whites to which a small percentage of dried egg white solids are added in an amount sufficient to provide about 13 to about 13.4% egg white solids, b. about 78 to about 85% water derived at least in major part from said liquid egg whites, c. and non-egg ingredients comprising vegetable gum and non-fat milk solids to give a syneresis value after double-boiler cooking of less than about 4%, d. the product having substantially no fat, cholesterol, or egg yolk and capable of being cooked into a scrambled egg type product.

The low-calorie egg product is optionally frozen and may contain about 0.5% flavor enhancer, from about 4 to about 4.4% dried egg white solids and/or about 0.6% vegetable gum and about 3% non-fat milk solids. A method of making such a product comprises the steps of:

a. combining liquid egg whites and dried egg white solids with vegetable gum and non-fat milk solids to form a liquid product containing on a solids basis about 13 to about 13.4% egg white solids, and b. pasteurizing the liquid product at a temperature of from 134° to 138° F., said product having a syneresis value of less than about 4% when cooked in a double-boiler, and having substantially no egg yolk, no fat, and no cholesterol and a calorie content less than that of the same weight of fresh whole eggs. The amount of egg white solids used in the process is, e.g., about 4 to about 5 percent.

It is a general object of the present invention to provide a substantially cholesterol-free fresh egg blend product in liquid or frozen-liquid [i.e., as opposed to freeze-dried] form which can be used to prepare many egg dishes in the same way that fresh natural eggs are used.

A further object of the invention is to provide a liquid egg blend product which is substantially free of fat/and low in calories, which contains at most only a trace of cholesterol, but which is high in protein and nutrition so as to be comparable to natural whole eggs in this respect, and which can be employed to prepare egg dishes which have an acceptable flavor and essentially the same appearance as egg dishes prepared from fresh natural eggs. [The whole egg is listed ("Nutritional Data", 3rd edition, Mellon Institute, Heinz Nutritional Research Division, H. J. Heinz Co., Pittsburgh, Pa., P.O. Box 57, 1956) second only to human whole milk in decreasing order of biological value. Even though the whole egg contains about 74 percent moisture, it is such a rich source of high-quality protein that many experimental nutritionists often use it as a standard for measuring the quality of other food proteins. According to Norman N. Potter ("Food Science", AVI Publishing Co., Inc., Westport, Conn., 1968), the true comparative value of different proteins depends upon their different amino acid components, particularly their content of essential (those which the body does not synthesize) amino acids.

The concern of the Government with the quality of protein in consumer goods is reflected in "Recommended Dietary Allowances" (RDA), NAS-NCR Report {cf. *Federal Register*, Vol. 38, No. 13, Part III, Jan. 19, 1973 (HEW, FDA, Food Labelling)}, 1968, where guidelines for high- and low-quality protein are provided. The report lists 45.5 grams of "ideal" protein as the RDA. Thus 45.5 grams, or the intergal value of 45 grams, is considered a reasonable figure for high-quality protein.

High-quality protein is provided by the following foods in decending order:

|  | Essential Amino Acid* (%) |
| --- | --- |
| Whole Milk (human) | 95 |
| Whole egg | 94 |
| Whole Milk (cow) | 90 |
| Egg Albumen | 83 |
| Corn Germ (defatted) | 78 |
| Animal Liver | 77 |
| Beef | 76 |
| Fish Muscle | 76 |
| Wheat Germ | 75 |
| Soy Bean Meal (low fat) | 75 |
| Whole Rice | 75 |
| Casein | 73 |

*in the food protein and corrected on the basis of an ideal protein containing 16% of nitrogen on a moisture and ash-free basis.

The common measure of the quality of all protein in a food is the Protein Efficiency Ratio (PER), which is obtained by an expensive and time-consuming bioligical feeding study wherein test animals, usually rats of a specific age, are maintained on a strictly-controlled diet and under close surveillance. By established standards, the size, weight and various other physical characteristics are thus shown to be influenced by the quality of dietary intake. By a simplified approach the Government assigns a value of 45 grams of total protein as the U.S. RDA for high-quality protein, i.e. protein having a PER value equal to or greater than that of casein, and a value of 65 grams of total protein as the U.S. RDA for low-quality protein, i.e. protein having a PER value less than that of casein.]

Another object of the invention is to provide a liquid egg blend product which is particularly useful in the diets of certain heart patients, and in the diets of others who are concerned with cholesterol content and with low fat and sugar content.

Still further objects of the invention are apparent from the detailed description and claims which follow.

DETAILS

The invention comprises essentially fat-, oil-, cholesterol-, calorie- and yolk-free fresh egg liquid product which has the appearance of a blend of fresh whole eggs, is highly palatable and nutritious and is useful, without reconstitution, for preparing scrambled eggs and omelets in the same manner as employed for whole fresh eggs. This product is, e.g., a liquid egg blend which comprises (by weight) from 60 to 96 parts of liquid natural egg whites, from zero to 18 parts of water, from 2.0 to 10.5 parts of protein replacement, e.g. nonfat dried milk solids (NFDM), powdered egg albumen and soy protein, from 0.2 to 0.95 part of stabilizer, from 0.1 to 2.5 parts of flavoring and from 0.01 to 0.20 part of coloring. The blend has a cholesterol content of at most 5.5 milligrams (mg) per 100 grams (g) and is thus at least 99 percent cholesterol free; it has at most 1.25 percent by weight of fat and has a maximum of 0.80 calorie per gram. The pH (from about 6.5 to about 8.5 and, in any event, less than 9.0) of the blend is essentially that of a freshly laid whole egg; the pH is not especially adjusted during the making of the blend.

Although the invention is not so restricted, the blend preferably has about the protein content of whole fresh eggs (about 12.9 grams per 100 grams of product) or slightly in excess thereof. The protein content of the blend is thus usually within the range of from about 11.0 g to about 13.0 g per 100 g of blend or slightly more, e.g. up to 15.0 g per 100 g of blend. As the protein content of fresh egg whites is about 10.9 percent by weight, the amount of protein replacement depends on the particular proportion of fresh egg whites (most suitably from fresh shell eggs) employed in the blend.

The proportion of solids in the blend is determined more from the standpoint of acceptance by the user than by any other single criterion. Although the solids may range, e.g., from 10 to 20 percent by weight, the range is more suitably limited to from 16 to 18 percent by weight and is preferably 17 percent by weight. As the average user is not familiar with the appearance of a homogenized blend of whole egg, the solids for the subject blend may vary considerably from that of a whole natural egg.

The ingredients are admixed in any combination and in any order which will produce a homogeneous blend. Part or all of any water (hot—at a temperature of, e.g., from 90° to 120° F.) is, e.g., admixed with the stabilizer and each of the ingredients (in finely-divided form) which is not readily water-soluble. The resulting dispersion (suspension and/or solution) is fed promptly (after preparation), but gradually, into a conduit through which the egg whites are being pumped. The resulting admixture is pumped back into a main reservoir of liquid egg whites. Those ingredients which are readily soluble in water are either concurrently introduced into the conduit or are added directly into the main reservoir, which is maintained under sufficient separate agitation, i.e. beyond that provided by the pump in the recirculation conduit, to keep the resulting blend essentially homogeneous.

Alternatively, water is mixed with flavoring and coloring and the resulting admixture is heated under agitation until it is essentially homogeneous. It is then cooled to from 40° to 50° F. before the protein replacement and stabilizer are blended in. Thereafter natural egg whites (from which the yolks have been removed) are added, and the resultant mixture is agitated until a smooth texture is formed.

Best results are presently obtained by stirring liquid egg whites (after separating yolks therefrom) in a refrigerated holding tank, pumping the liquid egg whites from the holding tank at a rate which is at least about 30 gallons per minute to and through a triblender [pumping equipment designed for hydrating (wetting or dispersing) dries (powdered components) into liquids], pumping effluent from the triblender (provided with a hopper for introducing ingredients) back into the holding tank, continuing circulation of the liquid egg whites from the holding tank through the triblender and back to the holding tank, slowly introducing a mixture of all of the dries into the triblender, heating the flavoring material (which is in a semi-solid state) in the water until the resulting admixture is in the liquid state, blending the coloring and any Vitamin A with the liquefied admixture of flavoring and water and introducing the thus-obtained product into the triblender, replacing the triblender (in the circuit) with a shear pump and continuing circulation of what is now a liquid egg white blend from the holding tank through the shear pump (which insures uniform dispersion of all of the ingredients) and back to the holding tank for a period of from three to five minutes for each 1000 pounds of total product.

When the formulation of the fresh egg white product lacks added water, the last noted procedure is also used. The only change is that the flavoring material (which is in a semi-solid state and is ordinarily supplied in double plastic bags) is submerged (while still in closed plastic bags) in hot water until it melts (liquefies). Thus-melted flavoring material is blended with the liquid coloring and any Vitamin A before introducing it in that form into the triblender.

After an essentially homogeneous blend (having a smooth texture) is prepared, the blend is ready for pasteurization, which is accomplished by standard procedures for pasteurizing egg whites. It is preferred to pasteurize at a temperature of from 134° to 138° F. without either adjusting the pH or adding any metal salt, e.g. aluminum sulfate, to the blend. Pasteurization is effected in the noted temperature range without egg-white coagulation (which occurs at 139° F.) or protein degradation. When a homogenized product is desired, homogenization is preferably effected during and prior to the completion of pasteurization with standard available equipment.

Although pasteurization is the preferred treatment, anti-oxidant and a suitable antibiotic are alternatively incorporated into the fresh blend to accomplish essentially the same result. Suitable antioxidants and antibiotics are known and do not constitute the essence of the subject invention.

When the fresh blend is suitably preserved, either by pasteurization or by antibiotics, it is packaged in containers which are kept refrigerated at a temperature between 33° and 38° F. or in frozen condition.

Egg Whites—Whole fresh liquid egg whites constitute about 64 percent by weight of a whole shell egg. Their solids content is about 12 percent by weight (according to Melnick), which is primarily protein. Fresh liquid egg whites have a protein content of about 10.9 percent by weight; they have a pH of about 7.6 [corresponding to a pH for freshly laid whole eggs which is ordinarily within the range of from 7.2 to 7.6] (when freshly laid), are virtually free from fat, oil, sugar and cholesterol and have only about 51 calories per 100 g. They constitute an excellent protein source and, based upon the subject invention, are a substitute for whole eggs in the preparation of egg dishes, such as scrambled eggs, omelets and souffles.

Throughout the disclosure all references to fresh egg whites are to fresh whites separated from yolk. However, in each instant, fresh frozen egg whites (with or without pasteurization) can be substituted for the fresh egg whites. Of course, the fresh egg whites are preferred.

Egg albumen or powdered albumen (PA) is derived from egg whites (EW). Egg white solids in any formulation includes solids from fresh egg whites (FEW) as well as those from any powdered albumen therein. The following calculations reflect the egg white solids and water in the compositions of Examples I, V and IX:

| EXAMPLE | INGREDIENT | WEIGHT PERCENT | SOLIDS (Wt. %) | EW SOLIDS |
|---|---|---|---|---|
| I | Fresh Egg Whites (FEW) | 72.15 (12%) | 8.658 | |
| | Powdered Albumen (PA) | 4.81 (91%) | 4.377 | 13.035 |
| | Water | | | |
| | 14.43 + [(72.15 + 4.81) − 13.035] = 78.355 | | | |
| V | FEW | 77.82 | 9.3384 | |
| | PA | 4.45 | 4.0495 | 13.388 |
| | Water | | | |
| | 11.12 + [(77.82 + 4.45) − 13.39] = 80. | | | |
| IX | FEW | 95.99 | 11.5188 | |
| | PA | 1.80 | 1.638 | 13.1568 |
| | Water | | | |
| | 0.50 + [(95.99 +1.80) − 13.16] = 85.13 | | | |

Viscosity—The viscosity of the blend is essentially controlled by the amount and type of stabilizer, but is clearly dependent upon the amount of protein replacement. The actual viscosity is not critical as long as the liquid blend can be handled in the same fashion as whole shell eggs in the preparation of scrambled eggs, omelets and souffles. The viscosity may thus range from about 9 centipoises (cp) to about 2000 cp, and is preferably from about 300 to 900 cp [Brookfield Viscometer, Model LVT, #1 to #3 spindles, at 50 to 60 rpm and at about 40° F.].

Protein Replacement—The protein replacement may be any relatively high protein source of high-quality protein which is compatible with liquid egg whites. NFDM [about 35 percent by weight (using a 6.25 protein nitrogen factor) protein], egg albumen solids (about 80 percent by weight protein) and soy protein solids (about 88 to 90 percent by weight protein) are excellent protein sources and are used separately or in any combination. Alternatively or in combination therewith any other non-fat dry milk solids, e.g., whey, are used.

When NFDM is employed in the blend, care must be taken not to use too great a concentration as an excess can adversely affect the flavor and the consistency of the blend as well as increasing the carbohydrate (and thus calorie) content. When most of the protein is furnished by NFDM, the latter is reinforced by other protein sources to boost the protein content without altering the flavor. This reinforcing of the protein may be accomplished by the use of dried egg albumen or soy bean products. Also, the principal source of protein may be a blend of sweet whey solids and soy flour with a reinforcement of dried albumen.

The entire problem of protein replacement is a prime concern of the subject invention. When the yolk is separated from whole fresh eggs, the remaining whites have a protein content of about 10.9, as opposed to about 12.9 for whole fresh eggs, grams per 100 grams of product. To reinforce the protein content and thus provide a product which more closely resembles a whole fresh egg in food value requires addition of high-quality protein sources to fresh egg whites. Those sources which are most compatible with fresh egg whites include NFDM, egg albumen, soy protein or soy proteinate, soy flour, defatted soy flour and casein. A comparative breakdown for some of these provides the following data (based on 100 grams of product):

|  | Egg Albumen | NFDM | Soy Protein | Soy Flour | Defatted Soy Floor |
| --- | --- | --- | --- | --- | --- |
| Calories | 372 | 359 | 312 | 421 | 326 |
| Water (gram, g) | 8.8 | 4.0 | 5.5 | 8 | 8 |
| Protein (g) | 80.2 | 35.8 | 80.6 | 36.7 | 47 |
| Fat (g) | 0.2 | 0.7 | 0.1 | 20 | 0.9 |
| Carbohydrate (g) | 5.7 | 51.6 | 7.7 | 30 | 30.8 |
| Sodium (mg) | 1103 | 526 | 1200 | 1 | 1 |

The choice of protein replacement is not simple and is related to the amount (if any) of water added. Although there is a tendency to add water in the formulation for ease of incorporating solid-ingredients and presumably to lower the overall cost, the addition of water concurrently lowers the protein concentration and thus requires greater supplementation. In practice, the reduction or elimination of added water has actually reduced the time, labor and equipment required to an extent which effects an overall saving. Through extensive experimentation, it has been found that the weight ratio of fresh egg whites to added water should be at least 4:1 (corresponding to a maximum water content of about 1.3 times that provided by the fresh egg whites) and preferably at least about 7:1. Especially with the latter limitation, but even with the former, the problems of selecting suitable combinations of reinforcing protein sources are minimized.

The prime protein reinforcing agent is NFDM, which has a favorable cost per unit weight of provided protein and provides very high-quality protein. However, NFDM is high is carbohydrates and the amino-acid analysis of protein supplied by NFDM varies somewhat from that of whole egg. Egg albumen protein supplements that found in NFDM to approximate more closely that found in whole egg. Unfortunately, there are some definite limits to the amount of egg albumen (employed in powdered or dried form) used since it imparts a distinct flavor of its own and can be detected on this basis at as low a concentration as about 1.5 percent by weight if not sufficiently masked by flavorant. To a lesser degree than egg albumen soy protein (or soy proteinate) supplements some amino-acid deficiencies (in approximating the amino-acid content of whole fresh egg) of NFDM. Soy protein also provides the resulting product with a "fatty mouth feel" which simulates a corresponding property of whole fresh egg. At a concentration of 1.5 percent by weight, however, soy protein imparts a characteristic flavor and a a reddish color. The flavor is actually detectable at concentrations as low as 0.9 percent by weight.

In the formulations presented in the working examples the protein sources are selected and combined to provide essential amino acids found in fresh whole egg in approximately their respective proportions and amounts.

A still further and complicating factor is the sodium content if care is to be taken to minimize the amount of this element in the resulting product. An attempt is made to maintain the egg-white blend at a sodium level which is at most 200 milligrams per 100 grams of blend.

Stabilizer—The stabilizer comprises one or a plurality of constituents which serve to emulsify as well as to stabilize the blend; it prevents or deters the ingredients from separating out and improves the texture so that the product resembles natural egg in liquid form. Thus, moisture is retained in dispersion when the product is frozen or refrozen so that water droplets do not form and crystalize out; stratification and grainy texture are prevented. As previously noted, the stabilizer is employed to control (increase) the viscosity.

One or a combination of vegetable gums, e.g. locust (carob) bean gum, agar gum, carrageenin, guar and gum tragacanth, is suitable for this purpose. The combination of all of the noted gums (standardized with dextrose) is completely satisfactory. Also, one or both of agar gum and gum tragacanth are alternatively omitted from such combination. Other similarly useful stabilizers include certified starch, propylene glycol alginate, carrageenin and mono- and diglycerides, which are useful in any combination with each other or with any of the previously-noted vegetable gums.

Stabilizers specifically prepared for foods are particularly advantageous. One such marketed food stabilizer (standardized with dextrose) contains guar gum, locust bean gum and gum tragacanth, has a pH between 6.0 and 7.0 and has a viscosity of from 1500 to 2000 centipoises [Food Stabilizer #242]; another [GM 510 ] comprises guar gum, carrageenin and mono- and diglycerides. [Both of these stabilizers (usable in any desired combination) are marketed by Germantown Manufacturing Company.]

Flavoring—The flavor of fresh eggs is, at once, delicate, elusive, neutral and extremely difficult to define, much less reproduce. As the flavor is attributable to egg yolk, researchers have given up the possibility of providing a palatable and tasty fresh egg product which is free from egg yolk and still acceptable for preparing such egg dishes as scrambled eggs, omelets and souffles.

Actually, flavor can be and is imparted to the blend by any one or a combination of such ingredients as salt, dextrose, monosodium glutamate and spice extracts, e.g. onion, turmeric, celery and white pepper. However, a feature of one phase of the subject invention is based on the recognition of the desirability of the flavor imparted to eggs by frying them, e.g. as scrambled eggs or omelets, in butter. The obtained taste is actually that of butter (which predominates) rather than anything attributable to egg flavor.

There are many butter flavorings available on the market. Those made from butter, non-fat milk solids, BHT and BHA (to improve stability) or lipase-modified milk fat products have proved satisfactory for imparting a suitable butter taste to the subject blends. However, many of the wholly artificial butter flavorings have proved completely unsatisfactory and yield only unacceptable products when incorporated in an egg white blend. Thus, butter flavoring derived at least in part from a natural butter source has been found useful for imparting a desirable taste to blends of this invention.

Coloring—Coloring is important from the standpoint of market-ability for use in the preparation of such egg dishes as scrambled eggs and omelets. It is also important for acceptability by those who actually use the blend for any purpose.

For imparting an appropriate color to the blend, minor proportions of FD&C yellow No. 5 and Yellow No. 6 or any similar FDA-approved color, e.g. Durkee's "Egg Shade", is employed.

Additives—As whole egg contains Vitamin A, Vitamin D, iron and thiamine, such constituents may be incorporated in the blend. The Vitamin A is incorporated in the form, e.g., of Vitamin A palmitate. Other additives are likewise incorporated in the blend, as desired.

From the preceding description the artisan can readily practice the present invention. The following examples include the preferred embodiments and are to be construed as merely illustrative and not, in any way, limitative of the remainder of the disclosure.

Overall ranges in parts by weight for the several essential ingredients are as follows:

|  | Parts (wt.) | % (wt.) |
| --- | --- | --- |
| Liquid natural egg whites | 60 to 96 | 65.3 to 96.8 |
| Water | zero to 18 | zero to 19.4 |
| Protein replacement | 2.0 to 10.5 | 1.7 to 17.2 |
| Stabilizer and emulsifier | 0.2 to 0.95 | 0.2 to 1.2 |
| Flavoring | 0.1 to 2.5 | 0.1 to 4.0 |
| Coloring | 0.01 to 0.20 | 0.01 to 0.2 |

For protein replacement from 0.5 to 5.5 parts by weight of NFDM, from 1.0 to 5.5 parts by weight of powdered albumen and/or from 0.5 to 5.5, but preferably not more than 1.5, parts by weight of soy protein are illustrative. Where the protein replacement is a combination of NFDM and egg albumen, it is most convenient to use from 3.75 to 6 parts by weight of NFDM and from 1 to 3 parts by weight of egg albumen.

As one aspect of the invention is independent of the specific stabilizer, flavoring or color, a number of the following examples do not state the corresponding ingredients; in each of those cases it is understood that any of the disclosed counterparts is suitable in the stated amount. In the following examples all figures are in parts by weight based on the total number of parts of the respective compositions.

|  | Example I | Example II |
| --- | --- | --- |
| Fresh egg whites | 75 | 60 |
| Water | 15 | 15 |
| NFDM | 5.0 | 0.7 |
| Powdered albumen | 5.0 | 2 |

-continued

|  | Example I | Example II |
| --- | --- | --- |
| Soy proteinate | 0.5 | 1.2 |
| Stabilizer and emulsifier | 0.75 | 0.5 |
| Flavoring | 2.5 | 2.0 |
| Coloring (Egg Coloring) | 0.2 | 0.15 |

|  | Example III |
| --- | --- |
| Fresh egg whites | 70 |
| Water | 17 |
| Blended soy protein, comprising |  |
| Sweet whey solids | 3.13 |
| Soy flour | 2.13 |
| Powdered albumen | 3.7 |
| Stabilizer and emulsifier | 0.3 |
| Flavoring | 1.0 |
| Coloring | 0.1 |

|  | Example IV | Example V | Example VI |
| --- | --- | --- | --- |
| Fresh egg whites | 68.1 | 70 | 70.8 |
| Water | 10.4 | 10 | 15.4 |
| NFDM | 4.3 | 3 | 2.1 |
| Powdered albumen | 2.7 | 4 | — |
| Soy Proteinate | — | 0.8 | 2.1 |
| Stabilizer and emulsifier | 0.4 | 0.6 | 0.4 |
| Flavoring | 1.1 | 1.5 | 1.1 |
| Coloring | 0.1 | 0.05 | 0.14 |

|  | Example VII |
| --- | --- |
| Fresh egg whites | 78.9 |
| Water | 11.3 |
| NFDM | 4.7 |
| Powdered albumen* | 1.4 |
| Soy proteinate** | 0.9 |
| Vegetable gum stabilizer (guar gum, locust bean gum, gum tragacanth), standarized with dextrose | 0.33 |
| Stabilizer (guar gum, carrageenin and mono- and diglycerides) | 0.38 |
| Butter Powder [Beatreme 743]*** | 0.94 |
| Lipase modified milk fat product |  |
| "LBO"-50 | 0.07 |
| "LBO"-1100 | 0.05 |
| Coloring | 0.1 |

*Powdered albumen is, e.g., pan-dried powdered albumen solids or spray-dried egg white solids; the latter is preferred. Each is commercially available in a form which has a minimum of 80 percent by weight of protein and a granulation such that 100 percent passes through a U.S.B. No. 60 Screen.
**Soy protein isolate [Carna-Pro 90], having a protein content of 90 percent, was used for this example.
***Made from butter, nonfat milk solids, and (BHT and BHA to improve stability).

|  | Example VIII | Example IX |
| --- | --- | --- |
| Fresh egg whites | 85 | 96 |
| Water | 7.2 | 0.5 |
| NFDM | 4 | 0.5 |
| Powdered albumen | 1 | 1.8 |
| Soy proteinate | 1.3 | 0.5 |
| Stabilizer and emulsifier | 0.4 | 0.2 |
| Flavoring | 1.0 | 0.5 |
| Coloring | 0.1 | 0.01 |

The present invention involves a new liquid egg product which is a blend of wholesome ingredients and which closely resembles whole egg in appearance and flavor. The blend (when properly preserved—as by pasteurization) is storage stable under refrigeration and will keep almost indefinitely in frozen-liquid condition. Desirable ingredients, such as protein, removed with the yolk have been replaced, but the final product is virtually free of fat and has only a trace of cholesterol. The calories have been reduced to a maximum of 0.8 calorie per gram of blend. While the product has been produced to enable those on special diets to enjoy nutritious scrambled eggs, omelets and souffles, it also provides a convenience food for any use, including baked goods and further processed foods. It does not have to be reconstituted, as do powdered or freeze-dried products, and can be kept in the refrigerator with dairy products.

Products based on Example VII, but fortified with additional iron, Vitamin A palmitate, Vitamin D and thiamine, provided the following analysis (per 100 grams) when compared with whole egg:

|  | Whole Egg | Blend |
|---|---|---|
| Calories | 163.0 | 64 to 65 |
| Carbohydrates, g | 0.9 | 3.7 to 4.7 |
| Protein, g | 12.9 | 11.6 to 12.6 |
| Total fat, g | 11.5 | 1.25 or less |
| Ash, g | 1.0 | 1.2 |
| Moisture, g | 73.7 | 82.6 to 83.0 |
| Cholesterol, mg | 550.0 | 1.65 to 5.5 |
| Iron | 2.3 | 0.2 to 2.3 |
| Vitamin A, I.U. | 1180.0 | 1840 |
| Thiamine, mg | 0.11 | 0.02 to 0.11 |
| Vitamin D, I.U. | 25.0 | 40 |
| pH | 7.6 | 7.6 |

Although the following examples are directed specifically to the compounding of the blend represented by Example VII, any blend according to this invention is readily compounded by the method of either of these examples.

EXAMPLE X

Mix 4.7 parts of Peake [product of Galloway-West Company] non-fat dry milk, 1.4 parts of Angel Type egg white solids [spray-dried egg white solids of Marshall Produce Company], 0.9 part of CarnaPro 90 [Carnation Company Industrial Products], 0.33 part of Food Stabilizer #242 [Germantown Manufacturing Company] and 0.38 part of GM #510 [Germantown Manufacturing Company] in a dry mixer until an essentially uniform dry admixture is formed.

Place 11.3 parts of hot (at a temperature of about 110° F.) water in a churn [suitably of the type generally employed for adding sugar to yolks, but any high speed (Lightning-type), e.g. bottom impeller, mixing tank is alternatively used] and disperse 0.94 part of Beatreme 743 [Beatrice Foods Co.], 0.07 part of "LBO"-50 and 0.05 part of "LBO"-110 [products of Dairyland Food Laboratories, Inc.] in the hot water while the latter is subjected to severe agitation in the churn. Then add the previously-prepared dry admixture slowly to the thus-formed dispersion under agitation in the churn to avoid any caking of the dry admixture.

When the churning constituents form an essentially homogeneous admixture, add thereto (while continuing the agitation) about 15 parts of the fresh egg whites and 0.1 part of an equal admixture of FD&C Yellow #5 and Yellow #6. Continue the churning for 20 minutes, and then pump the thus-churned product through a filter into a reservoir containing the remainder of the fresh egg whites under agitation.

As soon as the resulting blend is homogeneous, pasteurize it at a temperature within the range of from 134° to 138° F. without altering its pH or adding a metal salt, e.g. aluminum sulfate, to it.

If desired, homogenize the blend prior to completing pasteurization to obtain a homogenized egg blend. All pasteurized products of this invention are similarly subject to homogenization to provide a homogenized blend.

EXAMPLE XI

Maintain 78.9 parts of fresh liquid shell-egg whites under agitation in a reservoir. Pump [positive displacement, 25 DO, pump] the liquid whites through a 10 horsepower, 3600 rpm, direct drive shear pump at the rate of about 30 gallons per minute from the bottom (outlet) of the reservoir through a conduit and back to the upper portion (but below the surface) of the reservoir. At a venturi (eductor) in the conduit between the positive displacement pump and the shear pump slowly introduce (from a hopper through a valve) the dry admixture (prepared as in Example X) into liquid egg whites circulating through the conduit.

At a second venturi (eductor) in the conduit (downstream from the first and just upstream from the shear pump) similarly introduce a dispersion in hot water (prepared as in Example X) of the flavoring to which the coloring has been added.

Pasteurize (as in Example X) when a homogeneous blend is obtained in the reservoir.

EXAMPLE XII

| | |
|---|---|
| Fresh egg whites | 89.15 |
| NFDM | 5.12 |
| Water | 3.05 |
| Powdered albumen | 1.02 |
| Stabilizer (7.4 parts GM 510 to 1 part #242 | 0.84 |
| Soy proteinate | 0.56 |
| "LBO"-50 | 0.11 |
| "LBO"-1100 | 0.05 |
| Coloring [Durkee's "Egg Shade"] | 0.07 |
| Vitamin A and minerals | (traces) |

Maintain the fresh egg whites (separated from yolk) in a refrigerated holding tank under continuous agitation. From the bottom of the holding tank pump (at a rate of at least 30 gallons per minute) the egg whites through a conduit, to and through a Tri-blender [equipment which disperses introduced powdered dry materials into liquid being pumped therethrough, the Tri-blender having a feed inlet (usually in the form of a conical hopper) for components to be introduced at this stage of the process] and back to a different part (usually at or near the top) of the holding tank continuously throughout the preparation.

Mix the NFDM, powdered albumen, stabilizer and soy proteinate and introduce the resulting admixture slowly into the hopper of the Tri-blender. Heat the water (to a temperature high enough to melt or liquefy the flavoring) before mixing it with the flavoring ["LBO"-50 and "LBO"-1100] and then add thereto the coloring and any Vitamin A and minerals before introducing the thus-obtained admixture into the Tri-blender hopper.

After all of the ingredients have been added to what is then a fresh egg white blend, reroute the circulating blend through a shear pump (at approximately the same rate) and back to the holding tank and maintain this shear-pump treatment for a period of from three to five minutes for each 1000 pounds of total product.

Pasteurize (as in Example X) when a homogeneous blend is obtained in the holding tank.

The entire process is effected without introducing air into the egg whites or the blend produced therefrom or with minimizing any air introduced.

EXAMPLE XIII

| | |
|---|---|
| Fresh egg whites | 92.80 |
| NFDM | 5.12 |
| Powdered albumen | 0.75 |
| Soy proteinate | 0.36 |
| Stabilizer (same as in Example XII) | 0.70 |
| Durkee's "Egg Shade" | 0.07 |
| "LBO"-50 | 0.13 |
| "LBO"-1100 | 0.05 |
| Vitamin A and minerals | (traces) |

Follow the procedure of Example XII except for the introduction of the flavor into the Tri-blender. While retaining the "LBO"-50 and "LBO"-1100 in the closed water-impervious plastic containers in which they are supplied (in premeasured lots according to specifications), submerge the plastic containers in hot water until the contents are completely liquefied. Remove the plastic containers from the water and admix their contents together and with the coloring and any Vitamin A and minerals before introducing the resulting admixture into the Tri-blender hopper. Thereafter proceed precisely as in Example XII.

The invention and its advangages are apparent from the foregoing description. Various changes may be made in the process or compositions without departing from the spirit and scope of the invention or sacrificing its material advantages.

What is claimed is:

1. A substantially fat-, oil,- cholesterol- and yolk-free fresh egg product with a maximum of 80 calories per 100 grams, a protein concentration of from 7.5 to 19 percent by weight and a maximum water content of about 1.3 times that found in fresh egg whites and which comprises from 60 to 96 parts by weight of liquid natural egg whites, zero to 18 parts by weight of added water, 2.0 to 10.5 parts by weight of egg-yolk-protein replacement, whereby said protein replacement with said natural egg whites provide combined protein-containing essential amino acids in approximately the same respective proportions as they occur in fresh whole eggs, 0.2 to 0.95 part by weight of stabilizer, 0.1 to 2.5 parts by weight of flavoring and 0.01 to 0.20 part by weight of coloring, which blend is useful, without reconstitution, for preparing scrambled eggs or omelets in the same manner as employed for whole fresh eggs and wherein said egg product, after doubler-boiler cooking, has a syneresis value of less than about 4 percent.

2. A product according to claim 1 which has a pH which is essentially that of a freshly-laid whole egg.

3. A product according to claim 1 which has a maximum of 5.5 milligrams of cholesterol and at most 1.25 grams of fat per 100 grams.

4. A product according to claim 1 which is homogeneous.

5. A product according to claim 1 having from 10 to 20 percent by weight of solids, having a viscosity and texture suitable for handling in the same manner as whole fresh eggs and being essentially homogeneous.

6. A product according to claim 1 which has substantially the same protein content as whole fresh eggs, has a butter-like flavor and is essentially homogeneous.

7. A product according to claim 1 which is substantially homogeneous, has a pH within the range of from 6.5 to 8.5 and is storage stable in frozen form.

8. A product according to claim 1 which is substantially homogeneous and wherein the protein replacement comprises an effective combination of members selected from the group consisting of non-fat dried milk solids, powdered egg albumen and soy protein.

9. A product according to claim 8 which is pasteurized and contains 0.5 to 5.5 parts by weight of non-fat dried milk solids.

10. A product according to claim 8 which is pasteurized and contains from 1.0 to 5.5 parts by weight of dried egg albumen.

11. A product according to claim 8 which is pasteurized and contains from 0.5 to 1.5 parts by weight of soy protein.

12. A product according to claim 1 which is essentially homogeneous and wherein the amount of liquid natural egg whites is at least seven times that of any water added thereto.

13. A product according to claim 1 wherein the sole water is virtually entirely that found in the liquid natural egg whites, the protein replacement, the stabilizer, the flavoring and the coloring.

14. A product according to claim 1 which contains from 11 to 13 percent by weight of protein.

15. A product according to claim 1 wherein the protein replacement is a combination of NFDM and egg albumen.

16. A product according to claim 15 wherein the ratio of NFDM to egg albumen in the protein replacement is from 3.75 to 6 parts by weight of NFDM to from 1 to 3 parts by weight of egg albumen.

17. A product according to claim 1 wherein the protein replacement is provided by a combination of high-quality protein sources.

18. A product according to claim 1 which is essentially homogeneous and has essentially the same protein content as whole fresh eggs.

19. A product according to claim 1 which contains at least 11 percent by weight of high-quality protein.

20. A product according to claim 1 containing about 89.15 percent by weight of liquid natural egg whites.

21. A product according to claim 1 containing about 92.80 percent by weight of liquid natural egg whites.

22. A substantially fat-, oil-, cholesterol- and yolk-free fresh egg product (according to claim 17) which is substantially homogeneous and comprises about 79 parts by weight of fresh liquid egg whites, about 11 parts by weight of water, about 5 parts by weight of NFDM, about 1 part by weight of powdered egg albumin, about 1 part by weight of soy protein, about 1 part by weight of stabilizer, about 1 part by weight of flavoring and about 0.1 part by weight of coloring.

23. A substantially fat-, oil-, cholesterol- and yolk-free fresh egg product with a maximum of 80 calories per 100 grams, a protein concentration of from 7.5 to 19 percent by weight and a maximum water content of about 1.3 times that found in fresh egg whites and consisting essentially of a blend of from 60 to 96 parts by weight of liquid natural egg whites, zero to 18 parts by weight of added water, 2.0 to 10.5 parts by weight of protein replacement, whereby said protein replacement with said natural egg whites provide combined protein-containing essential amino acids in approximately the same respective proportions as they occur in fresh whole eggs, 0.2 to 0.95 part by weight of stabilizer, 0.1 to 2.5 parts by weight of flavoring and 0.01 to 0.20 part by weight of coloring, which blend is useful, without reconstitution, for preparing scrambled eggs or omelets in the same manner as employed for whole fresh eggs and wherein said egg product, after double-boiler cooking, has a syneresis value of less than about 4 percent.

24. A cholesterol-free low calorie egg product comprising by weight
 a. liquid egg whites in combination with sufficient dried egg white solids to provide about 13 to about 13.4% egg white solids,
 b. about 78 to about 85% water derived at least in major part from said liquid egg whites, and
 c. non-egg ingredients comprising vegetable gum and non-fat milk solids to impart to the product a syneresis value, after double-boiler cooking, of less than about 4%,
 d. the product having substantially no fat, cholesterol, or egg yolk and capable of being cooked into a scrambled egg type product.

25. The product of claim 24 including about 0.6% vegetable gum and about 3% non-fat milk solids.

26. The product of claim 24 including about 0.5% flavor enhancer.

27. The product of claim 24 which is frozen.

28. An egg product as defined in claim 24 wherein the amount of said dried egg white solids is from about 4 to about 4.4%.

29. A method of making a cholesterol-free low calorie egg product comprising the steps of:
 a. combining liquid egg whites and dried egg white solids with vegetable gum and non-fat milk solids to form a liquid product containing on a solids basis about 13 to about 13.4% egg white solids, and
 b. pasteurizing the liquid product at a temperature of from 134° to 138° F.,
said product having a syneresis value of less than about 4% when cooked in a double-boiler, and having substantially no egg yolk, no fat, and no cholesterol and a calorie content less than that of the same weight of fresh whole eggs.

30. A method as defined in claim 29 wherein the amount of said dried egg white solids is about 4 to about 5%.

* * * * *